United States Patent
Mikashima (10) Patent No.: US 10,262,248 B2
(45) Date of Patent: Apr. 16, 2019

(54) IMAGE FORMING APPARATUS AND METHOD FOR CONTROLLING IMAGE FORMING APPARATUS

(71) Applicant: KYOCERA Document Solutions Inc., Osaka (JP)

(72) Inventor: Katsuo Mikashima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/695,699

(22) Filed: Sep. 5, 2017

(65) Prior Publication Data

US 2018/0082161 A1 Mar. 22, 2018

(30) Foreign Application Priority Data

Sep. 21, 2016 (JP) .................................. 2016-184517

(51) Int. Cl.
  *G06K 15/00* (2006.01)
  *G03G 15/00* (2006.01)
  *H02M 1/00* (2006.01)

(52) U.S. Cl.
  CPC ..... *G06K 15/4055* (2013.01); *G03G 15/5004* (2013.01); *G03G 15/80* (2013.01); *H02M 2001/0006* (2013.01); *H02M 2001/0032* (2013.01)

(58) Field of Classification Search
  None
  See application file for complete search history.

(56) References Cited

U.S. PATENT DOCUMENTS

| | | | | |
|---|---|---|---|---|
| 2012/0098351 A1* | 4/2012 | Ross | .................. | A61B 18/1233 307/104 |
| 2012/0212196 A1* | 8/2012 | Ozasa | .................... | G03G 15/80 323/271 |
| 2013/0241508 A1* | 9/2013 | Uehara | ..................... | G05F 1/10 323/282 |

FOREIGN PATENT DOCUMENTS

JP           2010-9259 A      1/2010

* cited by examiner

*Primary Examiner* — Lennin R Rodriguezgonzalez
(74) *Attorney, Agent, or Firm* — Stein IP, LLC (57) ABSTRACT

An image forming apparatus includes a storage unit, a connector including a power supply terminal, a power supply unit for generating an operating voltage, a switch for turning on and off application of the operating voltage to the power supply terminal, a capacitor connected between the power supply terminal and the switch, and a control circuit configured to start up when a reset signal is changed. When the main power supply is turned on, the switch is temporarily turned on, and the reset signal is changed after the switch is turned off. After a start-up process is started, the control circuit interrupts the start-up process when recognizing that there is a connected device based on a result of comparison between a capacitor voltage and a threshold voltage.

8 Claims, 6 Drawing Sheets

IMAGE FORMING APPARATUS AND METHOD FOR CONTROLLING IMAGE FORMING APPARATUS

INCORPORATION BY REFERENCE

This application is based upon and claims the benefit of priority from the corresponding Japanese Patent Application No. 2016-184517 filed Sep. 21, 2016, the entire contents of which are hereby incorporated by reference.

BACKGROUND

The present disclosure relates to an image forming apparatus that supplies power to a device connected to a connector.

A PC may be connected to a peripheral device. When a main power supply is turned on, the PC main body starts to operate. During a start-up process, it is checked whether or not a peripheral device is connected. In order to check whether or not a peripheral device is connected, it is necessary that the peripheral device is supplied with power and has started up. When a start-up time of the peripheral device is long, it may take time to start up the BIOS and OS of the PC main body. For this reason, an example of technique for shortening start-up time of the BIOS and OS is known as below.

Specifically, there is known a peripheral device having a delay mode in which it starts up after the OS of the PC has started up. In the delay mode, after being supplied with power from the PC, the device waits until a delay time stored in it elapses. After the delay time elapses, the device performs plug-and-play connection to the PC. In this way, the PC does not detect the peripheral device during start-up of the BIOS and OS. Thus, start-up time of the BIOS and OS is shortened.

An image forming apparatus such as a multifunction peripheral, a copier, a printer, or a FAX device may be provided with a connector. This connector is used for connecting a storage device such as a USB memory or a memory card, or an input device such as a keyboard. For example, using data stored in a connected storage device, the image forming apparatus can perform printing and transmission.

A control circuit such as a CPU in the image forming apparatus (host, main body side) transmits a call (request) to the device via the connector. The device connected to the connector responds to the request and replies a response. In this way, communication is performed between the control circuit and the device. On the basis of the communication with the device, the control circuit recognizes presence or absence of connection of the device, and recognizes which device is connected.

Here, the time after the control circuit issues the request until the device is finally recognized (response time of the device) is different depending on the device. For example, the USB standard does not define the time after the control circuit issues the request until the device is recognized. The time has a variation depending on the device. As slower the device responds, the time until the control circuit recognizes the device becomes longer. In the USB standard that supports increasing types of devices, the time limit after the request until the control circuit recognizes the device is being relieved.

From a viewpoint of security, the image forming apparatus may impose a restriction of use of specific data that adds a change to the backbone of the system. The specific data can be used only when the device is recognized and the specific data can be read within a predetermined time after the start-up process is started after the main power supply is turned on. Specifically, the device storing the specific data is connected before the main power supply is turned on. Then, the process based on the specific data is started only when the control circuit recognizes the device and the specific data can be read within the predetermined time after the start-up process is started after the main power supply is turned on.

However, when using a device having a slow response, the control circuit may not be able to recognize the device within a predetermined time after the start-up process is started. The control circuit may recognize connection of the device after the start-up process is completed. Otherwise, the control circuit may recognize connection of the device after the start-up process has proceeded to a stage such that the process based on the specific data cannot be started. In this way, there is a problem that a device having a slow response cannot be used. It is necessary to check a device having a time until being recognized within a permissible range (device having a short response time) among many available devices in the market, and this is inconvenient.

It is considered to set a standby time for interrupting the start-up process to recognize the device, so that the process based on the specific data can be performed regardless of length of the response time. However, when the start-up process is interrupted, the time necessary for the start-up process is increased. In addition, wasteful waiting occurs in a case where no device is connected.

The above-mentioned known technique decreases start-up time of the BIOS and OS. This technique does not check connection of the device during the start-up process. During the start-up process, data cannot be read from the device. In addition, there is no description about length of time until the connection is recognized. Therefore the problem described above cannot be solved.

SUMMARY

An image forming apparatus according to an aspect of the present disclosure includes a storage unit, a connector, a power supply unit, a switch, a capacitor, a control circuit, a start-up control unit, a voltage comparing unit, and a state storage unit. The storage unit stores software. The connector is for connecting a device and includes a power supply terminal for supplying power to the connected device. The power supply unit generates an operating voltage for operating the device connected to the connector when a main power supply is turned on. The switch turns on and off application of the operating voltage to the power supply terminal. The capacitor is connected between the power supply terminal and the switch. The control circuit starts a predetermined start-up process based on the software when an input reset signal changes from a first level to a second level, and recognizes the device connected to the connector after the start-up process is started. When the main power supply is turned on, the start-up control unit keeps the reset signal at the first level, turns on the switch to charge the capacitor while the reset signal is kept at the first level, then turns off the switch, and changes the reset signal to the second level so that the control circuit starts the start-up process after the switch is turned off. The voltage comparing unit compares a comparison reference voltage between the power supply terminal and the switch with a threshold voltage so as to output a result of the comparison. The state storage unit stores the result of the comparison by the voltage comparing unit at any time point after the reset signal changes to the second level until the control circuit turns on the switch, after the start-up control unit turns off the switch. Then, after the start-up process is started, the control circuit checks the result of the comparison stored in the state storage unit, recognizes presence or absence of connection of the device based on the result of the comparison, interrupts the start-up process when recognizing there is a connected device, communicates with the device, checks whether or not the device stores start-up data, and performs a process based on the start-up data when the start-up data is stored.

Further features and advantages of the present invention will become apparent from the description of embodiments given below.

DETAILED DESCRIPTION

The present disclosure aims at being able to recognize presence or absence of connection of a device promptly after the start-up process is started. Data stored in a storage device that needs a long time until recognizing connection is read during the start-up process. It aims at being able to perform a process based on the data read during the start-up process.

Hereinafter, an embodiment of the present disclosure is described with reference to FIGS. 1 to 7. In the following description, a multifunction peripheral 100 is exemplified as an image forming apparatus. However, elements such as structures and arrangements described in the embodiments should not be interpreted as limitations of the scope of the disclosure but are merely examples for description.

(Outline of Image Forming Apparatus)

Figure 1:
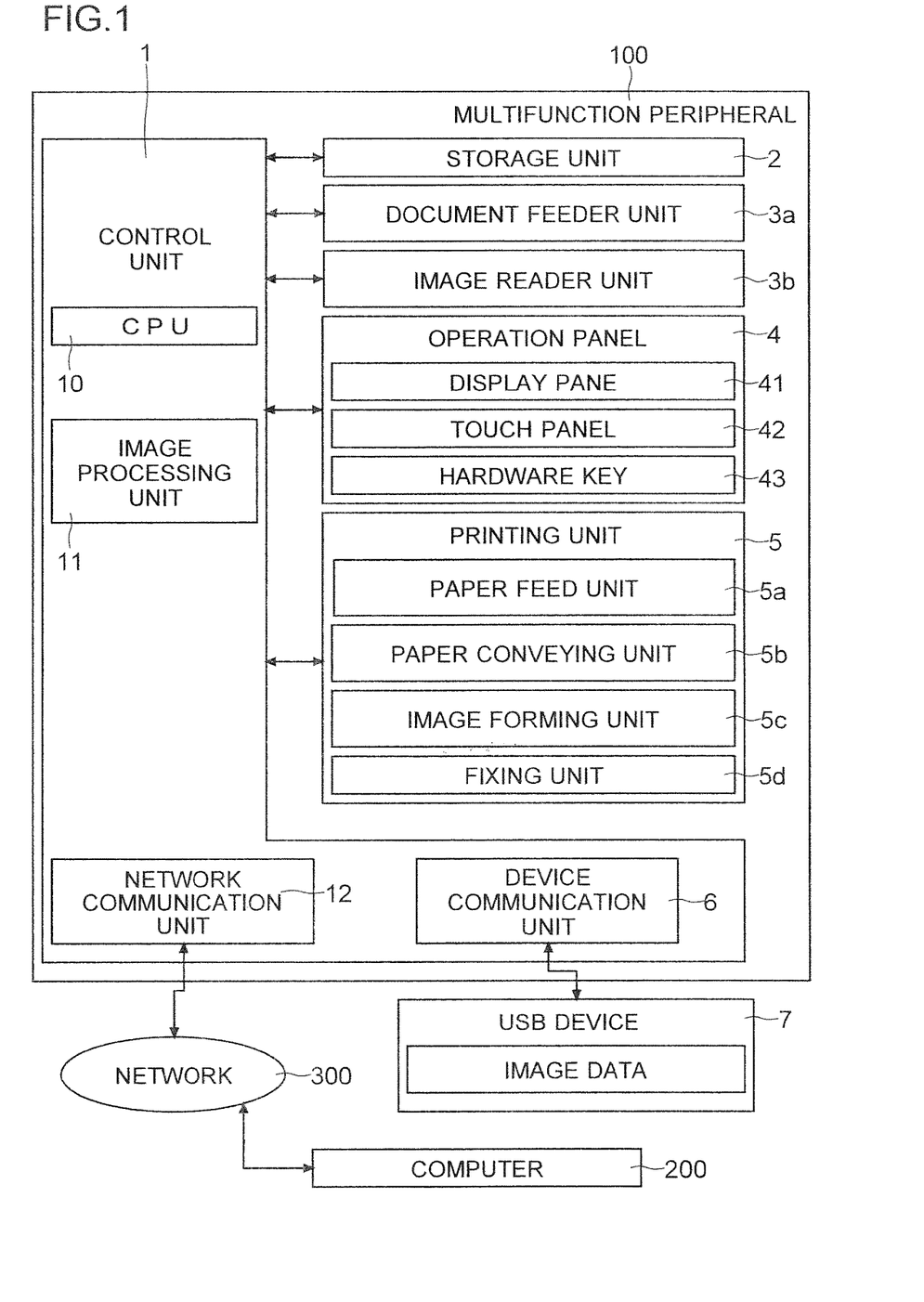
FIG. 1 is a diagram illustrating an example of a multifunction peripheral according to an embodiment.

First, with reference to FIG. 1, outline of the multifunction peripheral 100 according to the embodiment is described. The multifunction peripheral 100 includes a control unit 1 inside. The control unit 1 is a main control circuit board. The control unit 1 controls individual portions of the multifunction peripheral 100. The control unit 1 includes a CPU 10 (corresponding to a control circuit), and an image processing unit 11. The CPU 10 performs various calculations and processes. The image processing unit 11 performs image processing on image data so as to generate image data to be used for printing or transmission. In addition, the multifunction peripheral 100 includes a storage unit 2. The storage unit 2 is connected to the control unit 1 in a communicable manner. The storage unit 2 is a combination of a nonvolatile storage device such as a flash memory or an HDD and a volatile storage device such as a RAM. The CPU 10 performs calculations and processes based on software and control data stored in the storage unit 2. The CPU 10 controls individual portions of the multifunction peripheral 100.

The multifunction peripheral 100 is provided with a document feeder unit 3a and an image reader unit 3b. The control unit 1 controls the document feeder unit 3a to feed set document sheets one by one in a continuous and automatic manner to a reading position (feed reading contact glass, not shown). The control unit 1 controls the image reader unit 3b to read the document sheet fed by the document feeder unit 3a or a document set on a place reading contact glass (not shown). The control unit 1 controls the image reader unit 3b to generate image data.

The multifunction peripheral 100 includes an operation panel 4. The operation panel 4 includes a display panel 41, a touch panel 42, and hardware keys. The display panel 41 displays setting screens for printing and scanning, and various messages. The touch panel 42 is provided to the display panel 41. A hardware key 43 is, for example, a start key. The operation panel 4 receives execution condition settings of jobs such as a print job and a transmission job (setting operations of set values). The control unit 1 recognizes content of setting made with the operation panel 4.

A printing unit 5 is disposed in the multifunction peripheral 100. The printing unit 5 includes a paper feed unit 5a, a paper conveying unit 5b, an image forming unit 5c, and a fixing unit 5d. When performing printing, the control unit 1 controls the paper feed unit 5a to feed a paper sheet. The control unit 1 controls the paper conveying unit 5b to convey the paper sheet fed from the paper feed unit 5a. The control unit 1 controls the image forming unit 5c to form a toner image based on image data. The control unit 1 controls the image forming unit 5c to transfer the toner image to the conveyed paper sheet. The control unit 1 controls the fixing unit 5d to heat and press the paper sheet with the transferred toner image. Thus, the toner image is fixed to the paper sheet. The paper sheet after fixing is discharged to the outside of the apparatus.

The control unit 1 includes a network communication unit 12. The network communication unit 12 performs communication with a computer 200 via a network 300. The computer 200 is, for example, a PC or a server. The control unit 1 controls the printing unit 5 to perform printing based on the print data (image data and print setting) received by the network communication unit 12 from the computer 200 (printer function). In addition, a network communication unit 12 can transmit the image data to the computer 200 (transmission function).

In addition, the control unit 1 includes the device communication unit 6. The device communication unit 6 communicates with the connected device. In the following description, there is described an example in which a USB device 7 that conforms to the USB standard is connected as the device to the device communication unit 6. The USB device 7 is a USB memory, for example. The device to be connected may be a device such as a memory card (e.g. an SD card) other than the USB memory. In this case, the device communication unit 6 includes hardware and software according to the standard.

As illustrated in FIG. 1, the USB device 7 can be connected to the device communication unit 6. The CPU 10 communicates with the USB device 7 via the device communication unit 6. The CPU 10 recognizes the connected USB device 7. For example, it is possible to read image data stored in the USB device 7 such as the USB memory connected to the device communication unit 6. It is possible to perform printing based on the read image data. In addition, the read image data may also be transmitted to the computer 200.

(Power Supply Unit 8)

Figure 2:
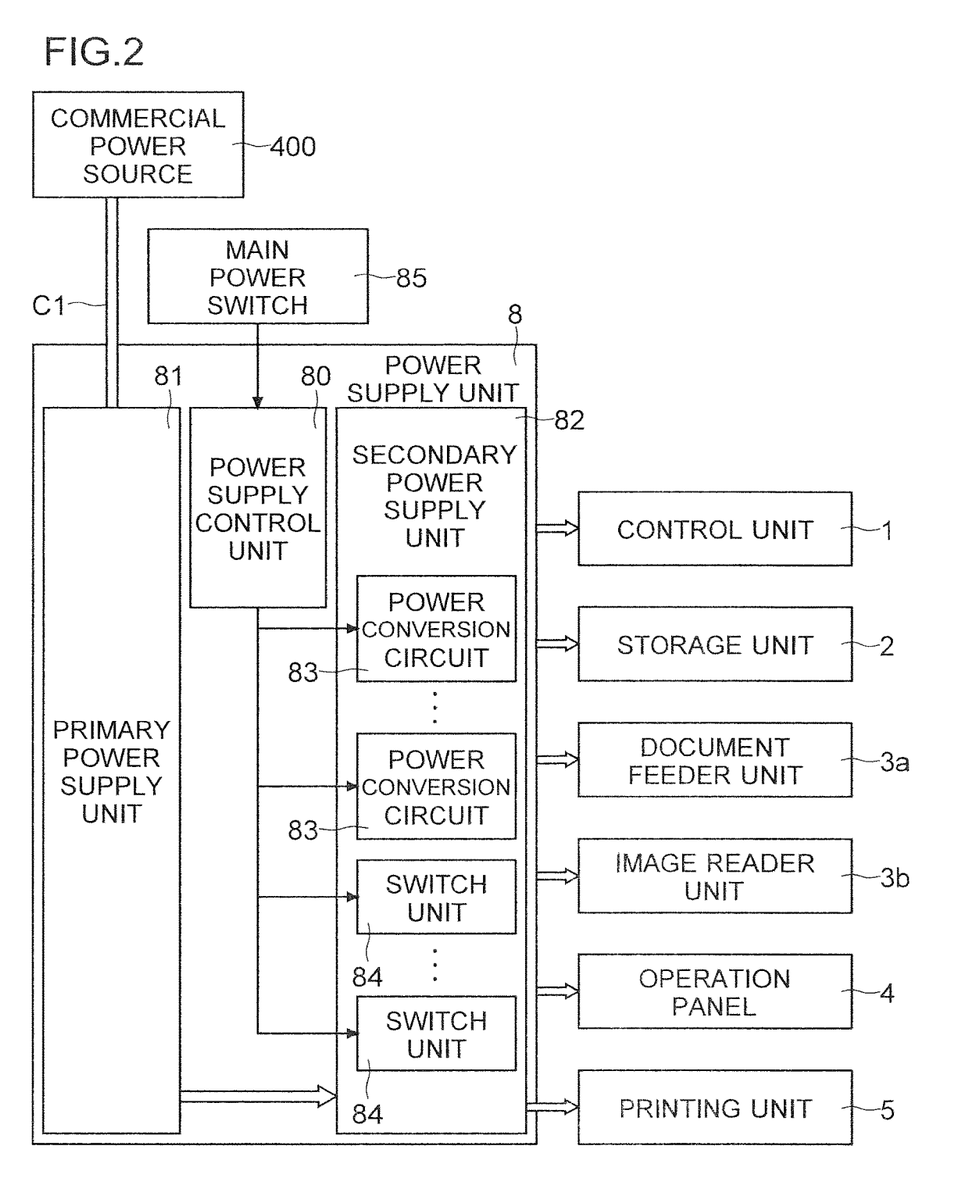
FIG. 2 is a diagram illustrating an example of a power supply unit according to the embodiment.

Next, with reference to FIG. 2, an example of a power supply unit 8 of the multifunction peripheral 100 according to the embodiment is described. The multifunction peripheral 100 includes the power supply unit 8. The power supply unit 8 includes a power supply control unit 80, a primary power supply unit 81, and a secondary power supply unit 82. A power cord C1 connects a commercial power source 400 and the multifunction peripheral 100 (primary power supply unit 81). The primary power supply unit 81 generates a DC voltage from the commercial power source 400 (AC voltage). The primary power supply unit 81 generates and outputs a predetermined voltage. For example, the primary power supply unit 81 generates DC 24 V for driving a motor.

The multifunction peripheral 100 is provided with various circuits and elements. A plurality of voltages are necessary for operations of the circuits and elements. For example, DC 5 V is necessary for supplying power to the USB device 7. In addition, a plurality of voltages are necessary for operations of the circuits and elements included in the control unit 1, the storage unit 2, the document feeder unit 3a, the image reader unit 3b, the operation panel 4, and the printing unit 5. In addition, a plurality of voltages may be necessary for operation of an integrated circuit such as the CPU 10 or the image processing unit 11. Therefore, the secondary power supply unit 82 generates a plurality of DC voltages based on the voltage generated by the primary power supply unit 81.

In order to generate a plurality of voltages, the secondary power supply unit 82 includes a plurality of power conversion circuits 83. The power conversion circuit 83 is, for example, a DC converter or a regulator. Output voltages of the power conversion circuits 83 are predetermined. The secondary power supply unit 82 generates and supplies voltages necessary for operations of the control unit 1, the storage unit 2, the document feeder unit 3a, the image reader unit 3b, the operation panel 4, and the printing unit 5. For example, the secondary power supply unit 82 outputs DC5.0V, DC3.3V, DC2.5 V, and DC1.8V.

Some power conversion circuits 83 supply power to a plurality of portions. Switch units 84 are disposed so that power supply to individual portions can be turned on and off respectively. The switch unit 84 is a switching element such as a transistor. A plurality of the switch units 84 can be disposed. The power supply control unit 80 controls on and off of the power conversion circuits 83. The power supply control unit 80 controls on and off of each switch unit 84.

By operating a main power switch 85, main power supply of the multifunction peripheral 100 can be turned on. Note that the main power switch 85 is a switch for turning on and off the main power supply. When the main power supply is turned on, from a viewpoint of preventing a malfunction, the power supply control unit 80 starts operations of the power conversion circuits 83 in a predetermined order at predetermined time points. In addition, the power supply control unit 80 turns on the switch units 84 at predetermined time points. When the main power supply is turned on, power supplies to the individual portions of the multifunction peripheral 100 are started in order. In the portion where the power supply is started, the start-up process is started. When the start-up process is completed in all portions, the start-up process of the multifunction peripheral 100 is completed.

Note that when the main power supply of the multifunction peripheral 100 is turned off by operation of the main power switch 85, the power supply control unit 80 stops operations of the power conversion circuits 83 in a predetermined order at predetermined time points. In addition, the power supply control unit 80 turns off the switch units 84 at predetermined time points.

(Software Update)

Figure 3:
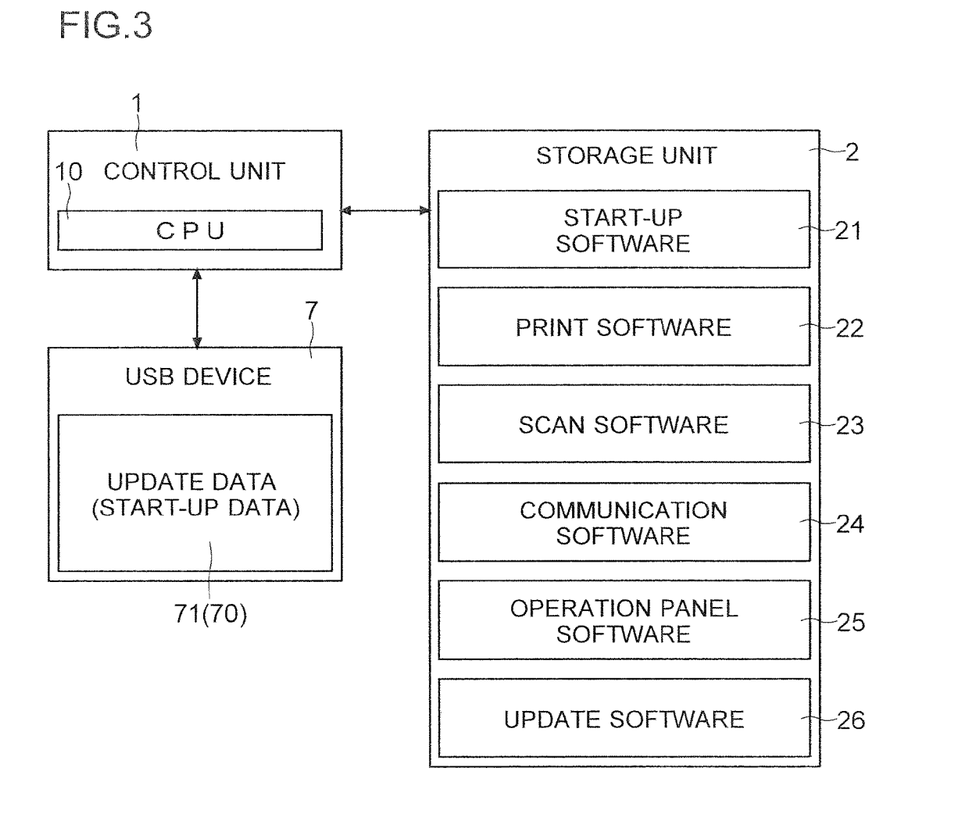
FIG. 3 is a diagram schematically illustrating software update of the multifunction peripheral according to the embodiment.

Next, with reference to FIG. 3, an example of software update in the multifunction peripheral 100 according to the embodiment is described. The storage unit 2 stores a plurality of software modules. As illustrated in FIG. 3, for example, the storage unit 2 stores software modules such as start-up software 21, print software 22, scan software 23, communication software 24, operation panel software 25, and update software 26. For example, these software modules are stored in a flash memory (flash ROM) of the storage unit 2. When the start-up process or a job is executed, the control unit 1 (CPU 10) reads and executes various software modules stored in the storage unit 2. The control unit 1 controls individual portions included in the multifunction peripheral 100 to operate in accordance with the software.

The start-up software 21 is used for the start-up process when the main power supply of the multifunction peripheral 100 is turned on. The start-up software 21 includes a batch process to be executed in the start-up process, for example. In addition, the start-up software 21 includes a program for recognizing individual portions (such as the device communication unit 6) included in the multifunction peripheral 100. The start-up software 21 includes a program for setting the recognized portion. The start-up software 21 includes a program of a process necessary for starting up the multifunction peripheral 100 in a state capable of executing a job. The start-up software 21 includes data that defines other software and data stored in the storage unit 2 to be read. The control unit 1 (CPU 10) executes the start-up process based on the start-up software 21 and starts up the multifunction peripheral 100.

The print software 22 is necessary for executing a print job. For example, the print software 22 includes programs and data used for controlling individual portions of the printing unit 5. The scan software 23 is necessary for scanning a document. For example, the scan software 23 includes programs and data used for controlling the document feeder unit 3a and the image reader unit 3b.

The communication software 24 is necessary for executing the transmission job. For example, the communication software 24 includes programs and data used for communication in the network communication unit 12 and the device communication unit 6. The operation panel software 25 is necessary for display on the display panel 41 and for receiving an operation. For example, the operation panel software 25 includes data of images to be displayed on the display panel 41. The operation panel software 25 includes programs for controlling the display panel 41 and the touch panel 42. The update software 26 includes programs used for updating software stored in the storage unit 2. The update software 26 includes a program for checking whether or not update data 71 is correct. The update software 26 includes a program for erasing and writing software.

In order to improve functions and to meet to user's desires, the multifunction peripheral 100 can update the software modules stored in the storage unit 2. In addition, a scale of each software module is increased. One of software modules may be updated to correct a defect that is unavoidably included.

It may not be desired that software update can be easily performed. For example, the software may be easily modified in a manner that the manufacturer does not intend. In addition, a person with little knowledge may perform unnecessary software update. In this case, operation of the multifunction peripheral 100 may become unstable. Therefore, for the multifunction peripheral 100, based on a contract, a service person is dispatched from a maintenance company, and the service person performs the software update.

The control unit 1 (CPU 10) reads the update data 71 from the connected USB device 7 in the start-up process. A USB memory can be used as the USB device 7 for storing the update data 71. In addition, a device including a nonvolatile memory can be used. For example, a smart phone having a USB interface can be used. On the basis of the update software 26 and the read update data 71, the control unit 1 controls the storage unit 2 to updates a software module to be updated. Note that the update data 71 may be downloaded to the multifunction peripheral 100 via the network 300.

It is not desired that the software update can be performed any time. Therefore, the multifunction peripheral 100 can perform the software update only when it can recognize that there is a connected USB memory based on an output of a state comparing unit described later after the start-up process is started when the main power supply is turned on. In other words, the software update can be performed only during start-up of the multifunction peripheral 100 (during the start-up process). In other words, the update data 71 is to be used in the start-up process (start-up data 70). Note that the CPU 10 can recognize presence or absence of the connected USB device 7 based on an output of the state comparing unit. The CPU 10 can recognize it earlier than normal communication based on the USB standard between the CPU 10 and the USB device 7. In addition, the CPU 10 can recognize it earlier than recognition of a device (acquisition of a device descriptor) by the CPU 10.

(Device Communication Unit 6)

Figure 4:
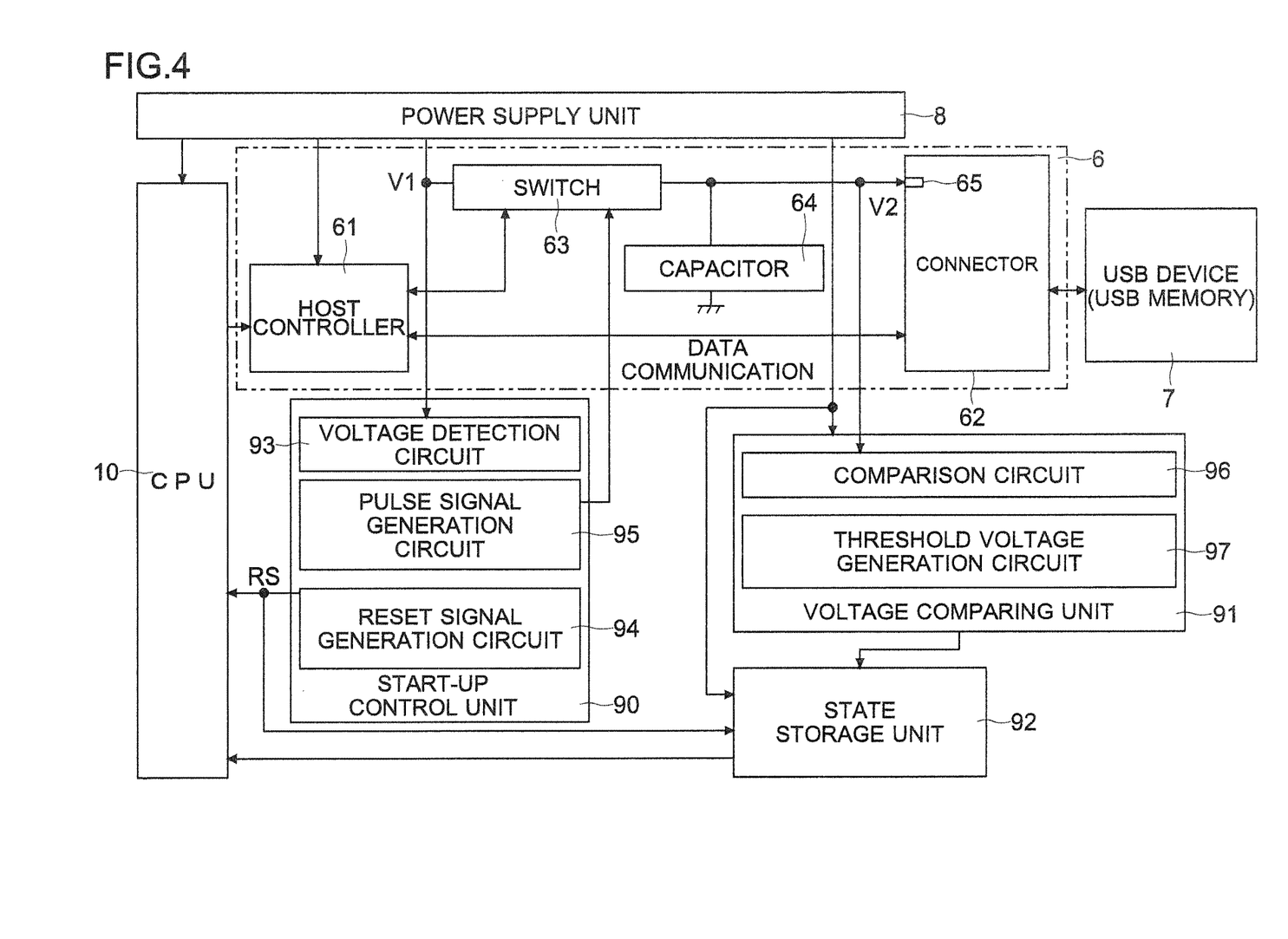
FIG. 4 is a diagram illustrating an example of a portion for recognizing presence or absence of connection of the device according to the embodiment.

Next, with reference to FIG. 4, an example of the device communication unit 6 according to the embodiment is described. The device communication unit 6 includes a host controller 61, a connector 62, a switch 63, and a capacitor 64. The device communication unit 6 is disposed in the control unit 1 (on the control circuit board).

The host controller 61 controls communication between the connected USB device 7 and the CPU 10. The host controller 61 receives power supplied from the power supply unit 8. When the main power supply is turned on, the power supply unit 8 starts to generate a voltage. When the generated voltage is increased to a voltage necessary for operation of the host controller 61, the host controller 61 starts to operate. The host controller 61 takes initiative of communication with the USB device 7. The communication between the CPU 10 and the USB device 7 is performed via the host controller 61.

The connector 62 conforms to the USB standard. The connector 62 includes a power supply terminal 65 (Vbus terminal). The connector 62 also includes a ground terminal, a D+ terminal and a D− terminal for data communication (not shown). The USB device 7 is connected to the connector 62. The USB device 7 connected to the connector 62 is supplied with power via the power supply terminal 65 and the ground terminal. In addition, data communication is performed between the host controller 61 and the USB device 7 via the D+ terminal and the D− terminal.

An operating voltage V1 generate by the power supply unit 8 (to be supplied to the USB device 7) is applied to the power supply terminal 65 via the switch 63. As the USB standard, the power supply unit 8 applies the operating voltage V1 at approximately 5 V to the power supply terminal 65. The switch 63 is disposed between the power supply unit 8 and the power supply terminal 65. One terminal of the switch 63 is connected to the power supply unit 8, and the other terminal is connected to the power supply terminal 65. The switch 63 turns on and off application of the operating voltage V1 to the power supply terminal 65. The host controller 61 can control on and off of the switch 63. The host controller 61 can control power supply to the connected USB device 7.

One terminal of the capacitor 64 is connected between the power supply terminal 65 and the switch 63. The other terminal of the capacitor 64 is connected to the ground. When the switch 63 is in the on state, the capacitor 64 is applied with the operating voltage V1 and is charged.

(Recognition of Presence or Absence of the USB Device 7 in Start-Up Process)

Figure 5:
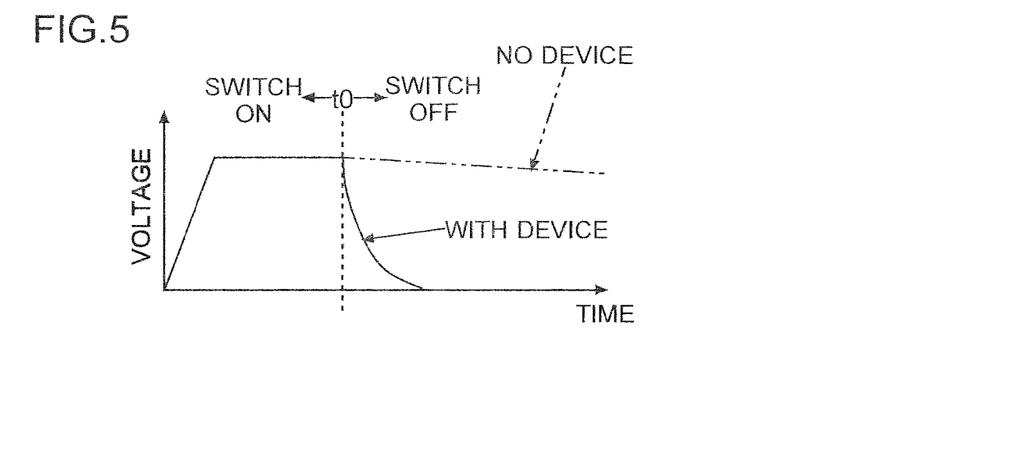
FIG. 5 is a diagram illustrating an example of an attenuation difference of a comparison reference voltage corresponding to presence or absence of connection of the device.
Figure 6:
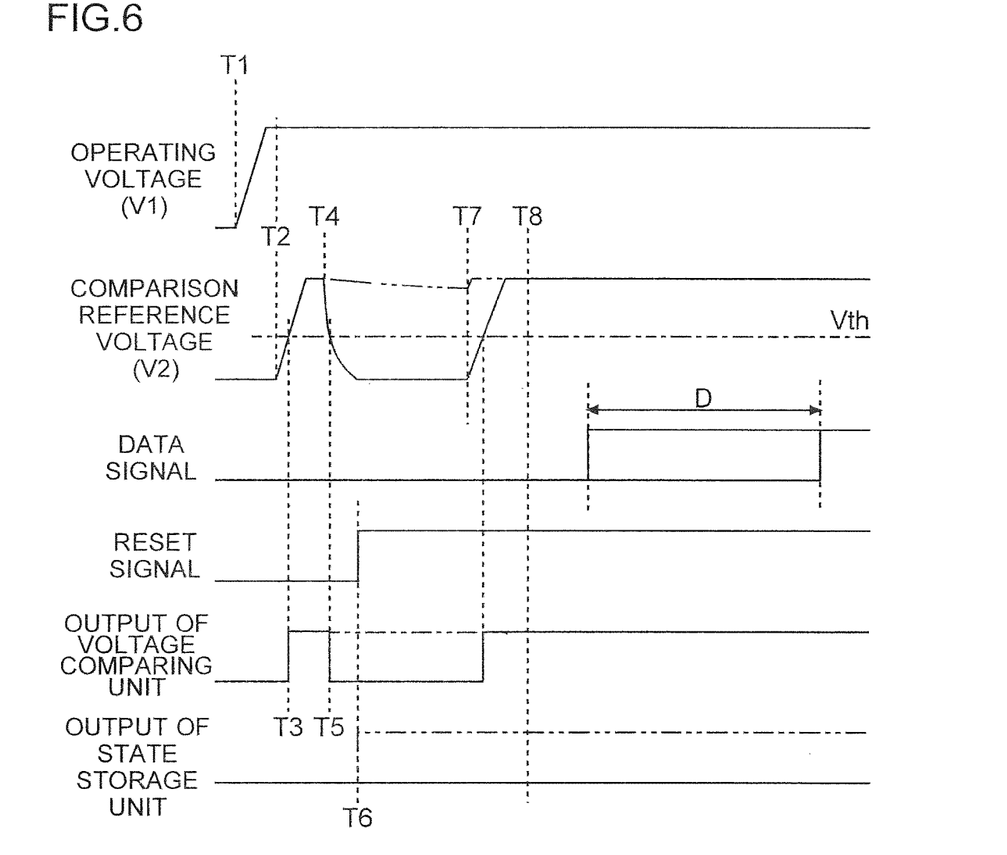
FIG. 6 is a timing chart illustrating an example of a flow of recognizing presence or absence of connection of the device when the multifunction peripheral starts up.

Next, with reference to FIGS. 4 to 6, there is described an example of a flow of recognizing the USB device 7 in the start-up process of the multifunction peripheral 100 according to the embodiment.

As described above, after the main power supply is turned on, the CPU 10 in the start-up process recognizes presence or absence of the connected USB device 7. When the recognized USB device 7 stores the update data 71, the CPU 10 starts the software update process based on the update data 71. The USB device 7 such as a USB memory is manufactured in conformity to the USB standard. Usually, the USB device 7 supplied with power from Vbus replies a response to a request from the host controller 61. In this way, the CPU 10 or the host controller 61 can recognize presence or absence of a connected device. On the basis of content of the replied response, it is possible to recognize which type of the USB device 7 is connected.

However, the time after the CPU 10 (host controller 61) issues the request to the USB device 7 until it completes the recognition of the USB device 7 by the communication conforming to the USB standard is different depending on the USB device 7. In other words, the time after the host controller 61 starts the transmission of the signal (connection check and request) via the connector 62 based on the instruction from the CPU 10 until all information necessary for recognizing the connection is received from the USB device 7 is different depending on the USB device 7.

Some USB devices 7 need long time after receiving the signal from the host controller 61 until replying a response. A certain USB device 7 replies a response in a few tens of milliseconds, while another USB device 7 replies a response after a few seconds. After the start-up process is started, in a case where no response can be received from the USB device in a predetermined time, a certain image forming apparatus determines that there is no connected device. Further, in that case, the image forming apparatus determines not to perform the software update. In this image forming apparatus, a USB device having a low response speed cannot be used for performing software update. In order to enable to perform the software update using a USB device having a low response speed, it is considered to interrupt the start-up process. However, if a wait time for response is provided, the time necessary for start-up of the multifunction peripheral 100 (user's wait time) is increased.

Therefore, the multifunction peripheral 100 enables fast recognition of presence or absence of connection of the USB device 7 (USB memory). Specifically, the multifunction peripheral 100 recognizes presence or absence of the USB device 7 connected to the connector 62 before the response via data communication.

Specifically, the USB device 7 connected to the connector 62 consumes power. When the switch 63 is turned off to stop power supply in the state where the USB device 7 is connected to the connector 62, the USB device 7 consumes charge stored in the capacitor 64.

FIG. 5 is a graph showing a change in a comparison reference voltage V2 between the power supply terminal 65 of the connector 62 and the switch 63. The comparison reference voltage V2 is a voltage between terminals of the capacitor 64. The horizontal axis of FIG. 5 represents time. The vertical axis thereof represents the comparison reference voltage V2. Further, time point t0 in FIG. 5 indicates the time point when the switch 63 is turned off to stop the power supply from the power supply unit 8.

In FIG. 5, a solid line shows an example of a change in the comparison reference voltage V2 when the USB device 7 is connected. When the USB device 7 is connected, the comparison reference voltage V2 is decreased. FIG. 5 shows an example in which the comparison reference voltage V2 is decreased in a curved manner. When the switch 63 is turned off in the state where the USB device 7 is connected, the voltage becomes zero or substantially zero in approximately a few tens of milliseconds, for example. On the other hand, in FIG. 5, a double dot and dashed line shows an example of a change in the comparison reference voltage V2 when the USB device 7 is not connected. When the USB device 7 is not connected, there is little decrease in the comparison reference voltage V2. The fact that the decreasing speed of the comparison reference voltage V2 when the switch 63 is turned off is different depending on presence or absence of connection of the USB device 7 is utilized. In the start-up process when the main power supply is turned on, presence or absence of connection of the USB device 7 is quickly recognized.

With reference to FIGS. 4 and 6, there is described an example of a flow of recognizing presence or absence of connection of the USB device 7 in the start-up process when the main power supply is turned on. First, as illustrated in FIG. 4, the multifunction peripheral 100 is provided with a start-up control unit 90, a voltage comparing unit 91, and a state storage unit 92. The start-up control unit 90 includes a voltage detection circuit 93 (voltage detector), a reset signal generation circuit 94, and a pulse signal generation circuit 95. The start-up control unit 90 is supplied with the operating voltage V1. The voltage detection circuit 93 detects that the operating voltage V1 exceeds a predetermined level.

The reset signal generation circuit 94 generates a reset signal RS that is input to the CPU 10. When the reset signal RS changes from a first level to a second level, the CPU 10 starts up itself and starts the start-up process. In this description, the first level is Low level, and the second level is High level. A pulse signal generation unit generates a pulse signal that instructs the switch 63 to be on or off. The pulse signal generation unit turns on and off the switch 63.

The voltage comparing unit 91 compares the comparison reference voltage V2 with a predetermined threshold voltage Vth. The voltage comparing unit 91 outputs a result of the comparison. The threshold voltage Vth is a voltage for determining presence or absence of connection of the USB device 7. For example, the threshold voltage Vth can be set to approximately ½ of the operating voltage V1. The voltage comparing unit 91 operates with power supplied from the power supply unit 8. The voltage comparing unit 91 includes a comparison circuit 96 and a threshold voltage generation circuit 97. The comparison circuit 96 is a comparator, for example. The threshold voltage generation circuit 97 includes a plurality of resistors, for example, so as to generate the threshold voltage Vth by voltage division by the resistors. The voltage comparing unit 91 outputs High level or Low level in accordance with the comparison reference voltage V2. For example, the voltage comparing unit 91 outputs High level when the comparison reference voltage V2 is higher than the threshold voltage Vth. The voltage comparing unit 91 outputs Low level when the comparison reference voltage V2 is the threshold voltage Vth or lower.

The state storage unit 92 is a circuit that stores a result of the comparison by the voltage comparing unit 91. The state storage unit 92 operates with power supplied from the power supply unit 8, too. For example, the state storage unit 92 is a latch circuit (D latch) that latches an output of the voltage comparing unit 91 based on a trigger signal. An output of the state storage unit 92 is input to the CPU 10.

Next, with reference to FIG. 6, there is described a flow of recognizing the USB device 7 when the main power supply is turned on. Time point T1 in FIG. 6 is the time point when the main power switch 85 turns on the main power supply of the multifunction peripheral 100. In this way, the power supply unit 8 starts to generate various voltages. In addition, generation of the operating voltage V1 to be applied to the power supply terminal 65 is started so that the operating voltage V1 starts to increase.

When it is detected that the operating voltage V1 is increased to a predetermined level, the start-up control unit 90 (the voltage detection circuit 93, the pulse signal generation circuit 95) temporarily turns on the switch 63 by a pulse signal (at time point T2 in FIG. 6). In this way, charging of the capacitor 64 is started. Along with charging of the capacitor 64, the comparison reference voltage V2 is increased. Before long, the comparison reference voltage V2 exceeds the threshold voltage Vth (at time point T3 in FIG. 6). When the comparison reference voltage V2 exceeds the threshold voltage Vth, the output of the voltage comparing unit 91 (comparison circuit 96) becomes High level (at time point T3 in FIG. 6). After the switch 63 is turned on and after the comparison reference voltage V2 becomes equal to the operating voltage V1, the start-up control unit 90 (pulse signal generation circuit 95) turns off the switch 63. Power supply to the power supply terminal 65 is stopped (at time point T4 in FIG. 6). Time necessary for charging is known in advance based on capacitance of the capacitor 64. The start-up control unit 90 (pulse signal generation circuit 95) turns on the switch 63 for a predetermined time necessary for charging.

An example of a change in the comparison reference voltage V2 when the USB device 7 is connected to the connector 62 is shown by a solid line in a second chart from the top in FIG. 6. When the USB device 7 is connected to the connector 62, the comparison reference voltage V2 is decreased and before long becomes the threshold voltage Vth or lower (at time point T5 in FIG. 6).

When the USB device 7 is connected and the comparison reference voltage V2 becomes the threshold voltage Vth or lower, the output of the voltage comparing unit 91 (comparison circuit 96) becomes Low level (at the time point T5 in FIG. 6). When the USB device 7 is not connected to the connector 62, the comparison reference voltage V2 is gently decreased. Therefore, when the USB device 7 is not connected, the comparison reference voltage V2 at the same time point exceeds the threshold voltage Vth (shown by a double dot and dashed line in a second chart from the bottom in FIG. 6). Therefore, the output of the voltage comparing unit 91 (comparison circuit 96) keeps High level (at the time point T5 in FIG. 6).

Here, when the reset signal RS becomes the second level, the CPU 10 starts the start-up process. As the start-up process of the CPU 10 proceeds, USB-related blocks of the start-up process software are sequentially executed. In this way, the CPU 10 starts communication with the host controller 61. In addition, the CPU 10 turns on the switch 63. The CPU 10 starts application of the operating voltage V1 to the connector 62. The CPU 10 starts to recognize the connected USB device 7.

When the USB device 7 is connected, in the period after the comparison reference voltage V2 becomes the threshold voltage Vth or lower (after the time point T4) until the switch 63 is turned on again (from the time point T4 to time point T7), the comparison reference voltage V2 keeps the threshold voltage Vth or lower. Therefore, the state storage unit 92 stores a result of the comparison by the voltage comparing unit 91 at any time point from time point A to time point B. The time point A is a time point when the reset signal RS is set to the second level (High level) after the switch 63 is turned off. The time point B is a time point (the time point T7) when the CPU 10 makes the host controller 61 turn on the switch 63. Note that the third chart from the top in FIG. 6 shows a shift width D at a response receiving time point due to a difference of response speed of the USB device 7.

Specifically, in the multifunction peripheral 100, the state storage unit 92 stores a result of the comparison by the voltage comparing unit 91 at the time point when the reset signal RS is changed to the second level (the time point when the reset of the CPU 10 is released, the time point when the stall-up of the CPU 10 is started, time point T6). Therefore, as illustrated in FIG. 4, the reset signal RS is input to the state storage unit 92 as a trigger for data latch. Note that the start-up control unit 90 may generate a signal to instruct the timing for the state storage unit 92 to latch. In this case, the start-up control unit 90 gives the signal that is not the reset signal RS to the state storage unit 92.

When the USB device 7 is connected, the comparison reference voltage V2 is the threshold value or lower. Therefore, the output of the state storage unit 92 at the time point T6 when the CPU 10 starts the operation, i.e. the start-up process becomes Low level (as shown by a solid line in the bottom chart in FIG. 6). On the other hand, when the USB device 7 is not connected, the comparison reference voltage V2 exceeds the threshold value. The output of the state storage unit 92 at the time point T6 when the CPU 10 start the operation, i.e. the start-up process becomes High level (as shown by a double dot and dashed line in the bottom chart in FIG. 6).

The CPU 10 checks the output level of the state storage unit 92 (High level or Low level). In this way, the CPU 10 can recognize whether or not the USB device 7 is connected, promptly after the start-up process is started (at the time point T6 in FIG. 6).

In the multifunction peripheral 100, the time after the start-up control unit 90 operates until the switch 63 is temporarily turned on, the time after the start-up control unit 90 operates until the switch 63 is temporarily turned off, and the time after the start-up control unit 90 operates until the reset signal RS is changed to the second level are predetermined. The start-up control unit 90 counts these time periods so as to turn on and off the switch 63 and to change the level of the reset signal RS.

(Flow of Start-Up Process of CPU 10)

Figure 7:
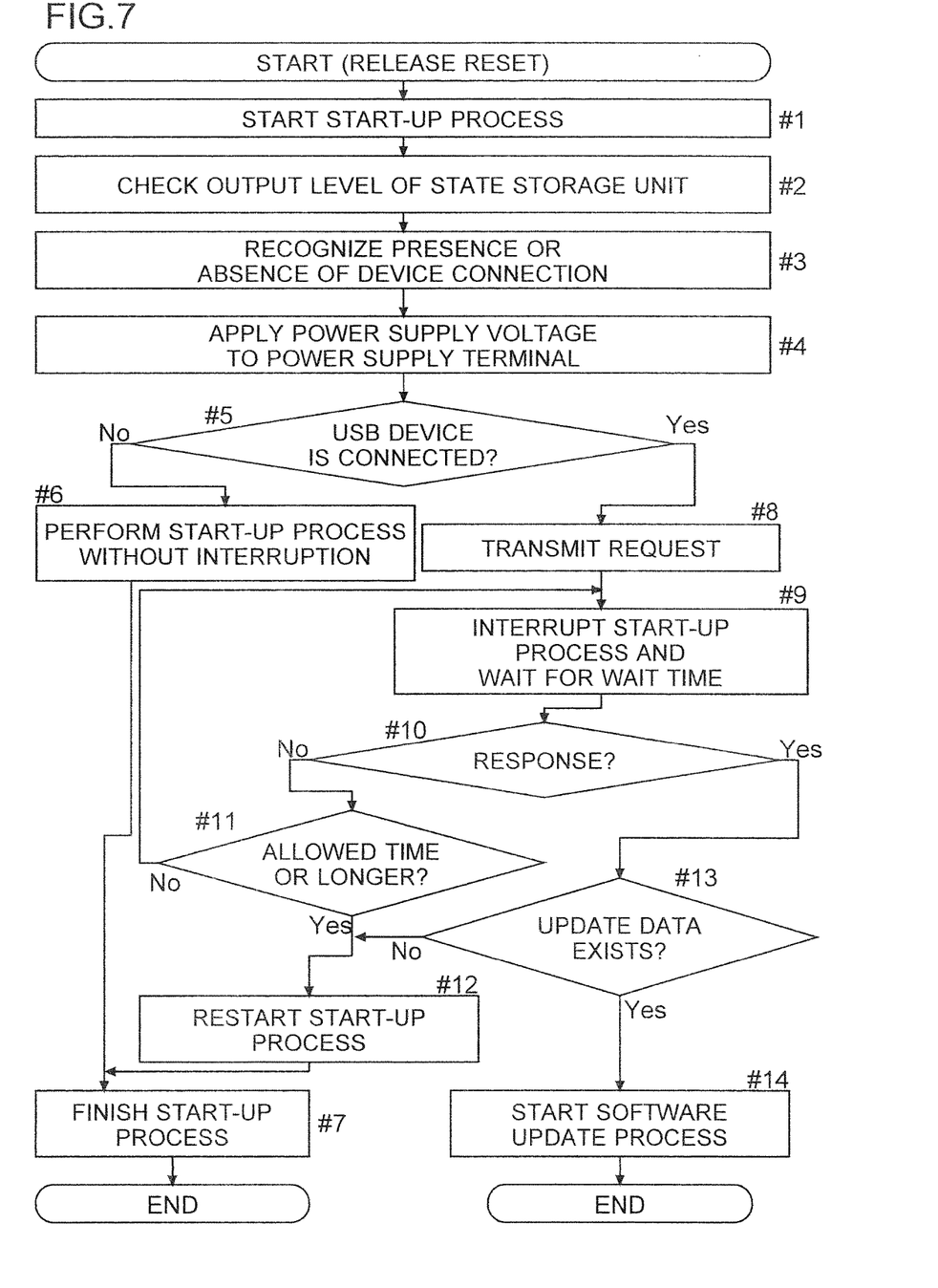
FIG. 7 is a flowchart illustrating an example of a flow of a start-up process of a CPU according to the embodiment.

Next, with reference to FIG. 7, an example of a flow of the start-up process of the CPU 10 according to the embodiment is described. The flow of FIG. 7 starts at the time point when the reset signal RS changes from the first level (Low level) to the second level (High level) (the time point when the reset is released). The CPU 10 starts the start-up process (Step #1). Then the CPU 10 checks the level of the output of the state storage unit 92 (Step #2). On the basis of the level of the output of the state storage unit 92, the CPU 10 recognizes presence or absence of connection of the USB device 7 (Step #3). Next, the CPU 10 makes the host controller 61 turn on the switch 63. The CPU 10 controls to apply the operating voltage V1 to the power supply terminal 65 (Vbus terminal of the connector 62) (Step #4).

When the USB device 7 is not connected (No in Step #5), the CPU 10 executes the start-up process without interruption (Step #6). Before long, the CPU 10 completes the start-up process (Step #7 to END).

On the other hand, when the USB device 7 is connected, the CPU 10 sends a request to the USB device 7 from the connector 62 (Step #8). Then the CPU 10 interrupts the start-up process. The CPU 10 waits for a predetermined wait time (Step #9). The wait time can be, for example, 50 to 200 milliseconds, and preferably, approximately 100 milliseconds.

After waiting for the wait time, the CPU 10 checks whether or not a response is received from the connected USB device 7 (Step #10). When there is no response (No in Step #10), in consideration of a case where the USB device 7 has a malfunction, the CPU 10 checks whether or not cumulative wait time from interruption of the start-up process has become a predetermined allowed time or longer (Step #11). For example, the allowed time can be a few seconds to approximately 10 seconds.

When the cumulative wait time becomes the allowed time or longer (Yes in Step #11), the CPU 10 restarts the start-up process (Step #12). Then the flow proceeds to Step #7. On the other hand, when the cumulative wait time is shorter than the allowed time (No in Step #11), the flow returns to Step #9, and further the CPU 10 interrupts the start-up process for the wait time.

When a response is received from the USB device 7 (Yes in Step #10), the CPU 10 checks whether or not the connected USB device 7 stores the update data 71 (Step #13). When the update data 71 is not stored (No in Step #13), the flow proceeds to Step #12.

When the update data 71 is stored (Yes in Step #13), the CPU 10 reads the update data 71. Then, the CPU 10 starts the process (software update process) based on the update data 71 (Step #14). Then, this flow is finished (END).

In this way, the image forming apparatus (multifunction peripheral 100) according to the embodiment includes the storage unit 2, the connector 62, the power supply unit 8, the switch 63, the capacitor 64, the control circuit (CPU 10), the start-up control unit 90, the voltage comparing unit 91, and the state storage unit 92. The storage unit 2 stores software. A device (USB device 7) is connected to the connector 62. The connector 62 includes the power supply terminal 65 for supplying power to the connected device. The power supply unit 8 generates the operating voltage V1 when the main power supply is turned on. The operating voltage V1 is a voltage for operating the device connected to the connector 62. The switch 63 turns on and off the application of the operating voltage V1 to the power supply terminal 65. The capacitor 64 is connected between the power supply terminal 65 and the switch 63. When the input reset signal RS changes from the first level to the second level, the control circuit starts the predetermined start-up process based on the software. After the start-up process is started, the control circuit recognizes the device connected to the connector 62. When the main power supply is turned on, the start-up control unit 90 keeps the reset signal RS at the first level. While the reset signal RS is kept at the first level, the start-up control unit 90 turns on the switch 63 so as to charge the capacitor 64. After the capacitor 64 is charged, the start-up control unit 90 turns off the switch 63. After the switch 63 is turned off, the start-up control unit 90 changes the reset signal RS to the second level so as to make the control circuit start the start-up process. The voltage comparing unit 91 compares the comparison reference voltage V2 between the power supply terminal 65 and the switch 63 with the threshold voltage Vth, and outputs a result of the comparison. After the switch 63 is turned off by the start-up control unit, the state storage unit 92 stores a result of the comparison by the voltage comparing unit 91 at any time point after the reset signal RS is changed to the second level until the control circuit turns on the switch 63. After the start-up process is started, the control circuit checks the result of the comparison stored in the state storage unit 92. On the basis of the result of the comparison, the control circuit recognizes presence or absence of connection of the device. When it is recognized there is a connected device, the control circuit interrupts the start-up process. The control circuit communicates with the device. The control circuit checks whether or not the device stores the start-up data 70. When the start-up data 70 is stored, the control circuit performs the process based on the start-up data 70.

Memory of the state storage unit 92 is checked. In this way, after the start-up process is started, presence or absence of connection of the device can be recognized earlier than the conventional process (than the process based on the standard). When there is a connected device, the start-up process can be interrupted and the wait time can be provided. In this way, it is possible to read the start-up data 70 from the device that needs a long time until recognizing connection. The process based on the start-up data 70 can be performed. Therefore it is possible to use the device that was not usable before because it needs a long time until recognizing connection. It is not necessary to select a device having a short response time (a usable device) among many devices available in the market. In other words, it is not necessary to select a device having a time until recognition within allowed range.

The start-up data 70 may be update data 71 of software. When recognizing that there is a connected device, the control circuit checks whether or not the device stores the update data 71. When the update data 71 is stored, the control circuit updates software stored in the storage unit 2 based on the update data 71. When the update data 71 is not stored, the control circuit releases interruption of the start-up process. In this way, the update data 71 can be read also from a device having a slow response speed. Even if a device having a slow response speed is used, software can be updated based on the update data 71. On the contrary, it is possible to perform the update only in a case where a device storing the update data 71 is connected to the connector 62 when the main power supply is turned on (when the start-up is performed).

In addition, when no response is received from the device in a predetermined allowed time after the start-up process is temporarily interrupted, the control circuit does not recognize the device. The control circuit releases interruption of the start-up process. In this way, it is possible not to wait for a response from a device having a malfunction or a device having a very slow response. Therefore it is possible to prevent the start-up process from continuing to be interrupted.

In addition, when it is recognized that there is no device connected to the connector 62, the control circuit performs the start-up process without interruption. In this way, it is possible to provide a case in which the start-up process is not interrupted based on a quick recognition result. Necessity of interruption is automatically determined. When the process based on the start-up data 70 is not performed (when a device is not connected), the time necessary for the start-up process can be shortened. In addition, a response is waited only when a device is connected. A response is not always waited. Wasteful interruption of the start-up process can be eliminated. Therefore it is possible to eliminate the time waiting for a response from a device when no device is connected. The time necessary for the start-up process can be shortened.

In addition, the state storage unit 92 is supplied with the reset signal RS. The state storage unit 92 may store a result of the comparison by the voltage comparing unit 91 at the time point when the reset signal RS changes from the first level to the second level. The reset signal RS is changed from the first level to the second level at the time point after the switch 63 is turned off and after the comparison reference voltage V2 becomes lower than the threshold voltage Vth by power consumption of the device. In this way, the state storage unit 92 can store a result of the comparison at the time point when a clear difference appears in the comparison reference voltage V2 in accordance with presence or absence of connection of the device. In other words, the state storage unit 92 can store a result of the comparison at the time point when the comparison reference voltage V2 securely becomes lower than the threshold voltage Vth by consumption of the charge of the device connected to the connector 62. Therefore the control circuit can precisely recognize presence or absence of connection of the device.

In addition, the device may be the USB device 7. In this way, the control circuit can promptly and precisely recognize whether or not the USB device 7 is connected to the connector 62.

Next, another embodiment is described. In the embodiment described above, the update data 71 is described as the start-up data 70. However, the start-up data 70 is not limited to the update data 71. For example, the start-up data 70 can be install data. The install data is data for installing new software or application in the storage unit 2.

Although the embodiments of the present disclosure are described above, the scope of the present disclosure is not limited to these embodiments and can be variously modified for implementation within the scope of the disclosure without deviating from the spirit thereof.

What is claimed is:

1. An image forming apparatus comprising:
    a storage unit for storing software;
    a connector for connecting a device, the connector including a power supply terminal for supplying power to the connected device;
    a power supply unit for generating an operating voltage when a main power supply is turned on;
    a switch for turning on and off application of the operating voltage to the power supply terminal;
    a capacitor connected between the power supply terminal and the switch;
    a control circuit configured to start a predetermined start-up process based on the software when an input reset signal changes from a first level to a second level;
    a start-up control unit configured to keep the reset signal at the first level when the main power supply is turned on, to turn on the switch during a period while keeping the reset signal at the first level so as to charge the capacitor, then to turn off the switch, and to change the reset signal from the first level to the second level after the switch is turned off;

a voltage comparing unit for comparing a comparison reference voltage between the power supply terminal and the switch with a threshold voltage so as to output a result of the comparison; and a state storage unit for storing the result of the comparison at any time point after the reset signal changes to the second level until the control circuit turns on the switch, after the start-up control unit turns off the switch, wherein the control circuit checks the result of the comparison stored in the state storage unit after the start-up process is started, recognizes presence or absence of a device connected to the connector based on the result of the comparison, interrupts the start-up process when recognizing that there is a connected device, communicates with the device, checks whether or not the device stores start-up data, and performs a process based on the start-up data when the start-up data is stored, and when the control circuit recognizes that there is no device connected to the connector, the control circuit performs the start-up process without interruption.

2. The image forming apparatus according to claim 1, wherein the start-up data is update data of software, and when the control circuit recognizes that there is a connected device, the control circuit checks whether or not the device stores the update data, updates the software stored in the storage unit based on the update data when the update data is stored, while releases interruption of the start-up process when the update data is not stored.

3. The image forming apparatus according to claim 2, wherein when no response is received from the device in a predetermined allowed time after the start-up process is temporarily interrupted, the control circuit releases interruption of the start-up process without recognizing the device.

4. The image forming apparatus according to claim 1, wherein the state storage unit is input the reset signal and stores the result of the comparison at the time point when the reset signal changes from the first level to the second level, and the start-up control unit changes the reset signal from the first level to the second level when the time necessary for the comparison reference voltage to become lower than the threshold voltage by power consumption of the device elapses after the switch is turned off.

5. The image forming apparatus according to claim 1, wherein the device is a USB device.

6. The image forming apparatus according to claim 1, wherein the start-up control unit includes a voltage detection circuit, and a pulse signal generation circuit, the voltage detection circuit detects that the operating voltage has exceeded a predetermined level, and the pulse signal generation circuit temporarily turns on the switch by a pulse signal in order to start charging the capacitor, and turns off the switch after the comparison reference voltage and the operating voltage become equal to each other.

7. The image forming apparatus according to claim 1, wherein the voltage comparing unit includes a comparison circuit, and a threshold voltage generation circuit, the threshold voltage generation circuit generates the threshold voltage, and the comparison circuit compares the comparison reference voltage with the threshold voltage, and outputs High level or Low level in accordance with the comparison reference voltage.

8. A method for controlling an image forming apparatus, the method comprising:

storing software;

providing a power supply terminal for supplying power to a device connected to a connector;

generating an operating voltage when a main power supply is turned on;

turning on and off application of the operating voltage to the power supply terminal using a switch;

connecting a capacitor between the power supply terminal and the switch;

making the control circuit start a predetermined start-up process based on the software when the reset signal changes from the first level to the second level;

keeping the reset signal at the first level when the main power supply is turned on;

turning on the switch to charge the capacitor during a period while the reset signal is kept at the first level;

turning off the switch after the capacitor is charged;

changing the reset signal from the first level to the second level after the switch is turned off;

comparing a comparison reference voltage between the power supply terminal and the switch with a threshold voltage so as to output a result of the comparison;

storing the result of the comparison at any time point after the reset signal changes to the second level until the control circuit turns on the switch, after the switch is turned off;

checking the result of the comparison after the start-up process is started;

recognizing presence or absence of a device connected to the connector based on the result of the comparison;

interrupting the start-up process when recognizing that there is a connected device, and communicating with the device so as to check whether or not the device stores start-up data;

performing a process based on the start-up data when the start-up data is stored; and on recognizing that there is no device connected to the connector, performing the start-up process without interruption.

* * * * *